UNITED STATES PATENT OFFICE.

CHARLES G. READ, OF BUFFALO, NEW YORK.

LOCKING DEVICE FOR AUTOMOBILES.

1,336,379. Specification of Letters Patent. Patented Apr. 6, 1920.

Application filed June 3, 1919. Serial No. 301,476.

*To all whom it may concern:*

Be it known that I, CHARLES G. READ, a citizen of the United States, residing at Buffalo, in the county of Erie and State of New York, have invented certain new and useful Improvements in Locking Devices for Automobiles; and I do hereby declare the following to be a full, clear, and exact description of the same, such as will enable others skilled in the art to which it appertains to make and use the same, reference being had to the accompanying drawings, and to figures of reference marked thereon, which form part of this specification.

Like figures of reference refer to like parts.

This invention relates to locking devices for automobiles.

One of the objects of this invention is to provide means for securely holding the steering wheel of an automobile in locked relation to the arced spark and gasolene lever bracket thereof. Another object is to provide a neat, inexpensive and serviceable device for the purpose, which is strong and not easily wrecked by ordinary tools.

A further object is to provide a locking device which easily adapts itself to the shape of the parts to be engaged in locked relation, and to provide such a device as can be easily put on and taken off, and also one with which most any kind of padlock can be used, so as to eliminate the possibility of duplication in locks, and to guard against the use of master keys as much as possible, by using any one of a variety of padlocks, all adapted to fit the same locking device parts.

With these and other objects my invention consists in certain features of construction, one embodiment of which is illustrated in the drawings, its use, and its adaptation for the purpose designed, is explained, and what I claim is set forth.

Figure 3:
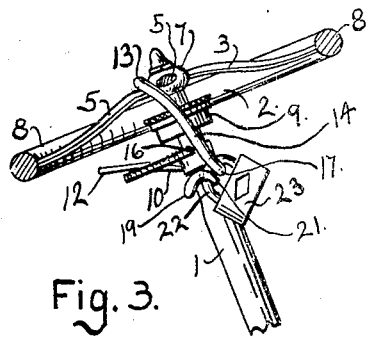
Fig. 3 is a sectional elevation of steering wheel and steering post of the Ford type, showing my device engaging parts thereof, in locked relation.
Figure 4:
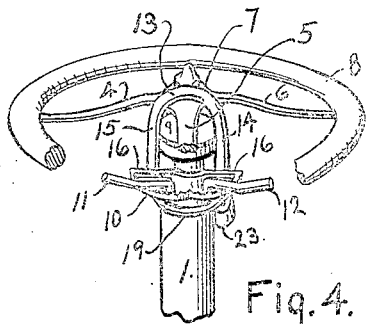
Fig. 4 is a sectional elevation, looking forward from the machine, illustrating another view of the parts shown in Fig. 3.
Figure 5:
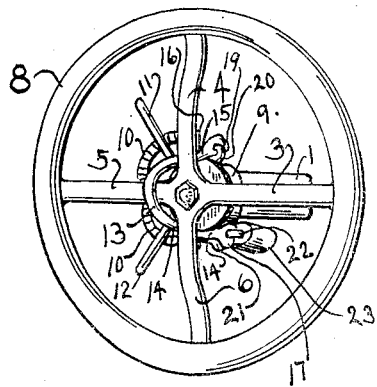
Fig. 5 is a top plan of the wheel and locking device shown in Figs. 3 and 4.
Figure 1:
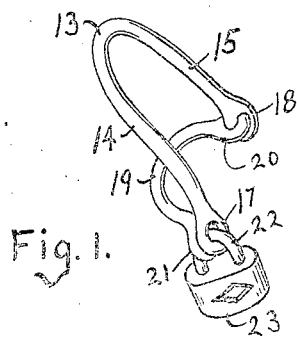
Figure 1 is a perspective view showing my locking device complete, including a padlock for securing the parts together.
Figure 2:
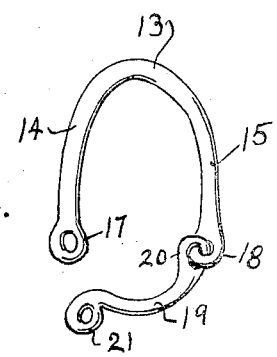
Fig. 2 is a front elevation of linked parts of my device, without the padlock.

In the figures, there is shown mounted at the top of the post 1, the steering wheel 2, having spokes 3, 4, 5 and 6 radiating from the hub 7, and terminating in the hand ring 8. Below the wheel 2, is the cylindrical box 9. Fixed upon the post 1, is the double arced bracket 10, slidingly engaged by the spark and gasolene levers, 11 and 12, respectively. The principal member 13, of my locking device, is shown in Figs. 3, 4, and 5 to straddle the spoke 5, having each leg 14 and 15, pass down against the spokes 4 and 6 and lie against the straight portion 16, of the bracket 10, and on opposite sides of the post. The leg 14 terminates in an eye 17, which may be either of a single piece, as shown in the figures or may simply be a bent end forming an eye. The leg 15 terminates in an eye 18. The member 19 terminates in one end in an eye 20, and engages the eye 18 of the leg 15. The other end of the member 19 terminates in an eye 21, which is adapted to be swung into position to register with the eye 17 of the leg 14, for engagement with the looped rod 22, of a padlock 23. The member 19 is bent to conform to the shape of the post 1 and the bracket 10.

In operation, the member 13 is placed over the spoke 5, as shown in Figs. 3, 4 and 5, having the legs 14 and 15 lie against or close to the spokes 4 and 6 and pass down in contact with the straight portion 16, of the bracket 10, and having the eyes 17 and 18 positioned below the bracket portion 16, after which the member 19 is brought around against the post 1 or the lower part of the bracket 10, and the eyes 17 and 21 are positioned to register with one another, after which they are engaged and locked together by the looped rod 22, of the padlock 23. When the padlock 23 is released, the part 19 falls loose from the post 1, and the device is easily removed and placed one side until required again.

Details of the embodiment of my invention herein shown and described, may be changed without departing from the spirit and scope thereof, I therefore do not wish to be confined to this one embodiment, hence I claim, 1. A locking device adapted to secure the steering wheel of an automobile against turning at the upper end of its post in relation to the spark and lever bracket fixed to said post, said device comprising two connecting members and a locking member, one of said connecting members being U-shaped with attachment ends, and formed to straddle the central portion of said wheel and pass down at an angle to the axis of said post, having its plane intersecting said axis, and having its ends reaching below said bracket, the other of said connecting members being bent to lie about said post, having connection with one of said attachment ends at one of its ends, said locking member having a releasable connection with the remaining ends of said connecting members.

2. A locking device for locking the steering wheel of an automobile against turning at the upper end of its post in relation to the spark and lever bracket fixed to said post, said device comprising a rigid U-shaped member having its ends each terminating in an eyelet, and formed to have the crotch of said U-shaped member positioned near the center of said wheel with its legs straddling said post, having the plane of said legs intersecting said post at an angle, with the eyelet ends of said U-shaped member terminating below said bracket, a curved member adapted to lie against said post, one end of said curved member having a linked connection with one of said eyelet ends, a locking member releasably connecting the other eyelet end of said U-shaped member with the remaining end of said curved member.

CHARLES G. READ.